United States Patent [19]

Rogers

[11] Patent Number: 5,489,010
[45] Date of Patent: Feb. 6, 1996

[54] RETRACTABLE VIDEO GAME CABLE STORAGE DEVICE

[76] Inventor: Irvin S. Rogers, 3114 S. Sheridan, Wichita, Kans. 67217

[21] Appl. No.: 292,215

[22] Filed: Aug. 19, 1994

[51] Int. Cl.⁶ .............................. H02G 11/02; A63F 9/22
[52] U.S. Cl. .................. 191/12.2 R; 273/148 B; 242/396.6
[58] Field of Search .................... 191/12.2 R, 12.4; 242/381, 381.6, 385, 385.4, 396.5, 396.6, 396.7, 396.8, 396.9; 273/148 B, 438, DIG. 21

[56] References Cited

U.S. PATENT DOCUMENTS

| | | | |
|---|---|---|---|
| 1,945,842 | 2/1934 | Witchger | 242/385.4 X |
| 2,637,109 | 5/1953 | Willis | 242/385.4 X |
| 2,979,576 | 4/1961 | Huber | 242/385.4 X |
| 3,705,962 | 12/1972 | Banister | 191/12.4 |
| 3,821,496 | 6/1974 | Malone | 191/12.2 R |
| 4,114,736 | 9/1978 | Scherenberg | 191/12.4 |
| 4,232,837 | 11/1980 | Cutler et al. | 242/372 |
| 4,509,383 | 4/1985 | Yeh | 191/12.2 R X |
| 4,735,377 | 4/1988 | Zuehsow | 191/12.2 R X |
| 4,901,938 | 2/1990 | Cantley et al. | 242/378.1 |
| 5,114,091 | 5/1992 | Peterson et al. | 242/378.3 |
| 5,168,969 | 12/1992 | Mayhew | 191/12.2 R |
| 5,180,040 | 1/1993 | Ji | 191/12.2 R |

*Primary Examiner*—Frank E. Werner
*Assistant Examiner*—Scott L. Lowe

[57] ABSTRACT

A video game cable storage device for storing the cable extending between a control pad and the video game unit. The inventive device includes a main body having a control cable reel rotatably supported by a cable reel axle. The cable reel is rotatably biased by a spiral spring so as to wind the control cable of the video into the main body and about the reel. The control cable communicates with a plurality of movable contacts positioned in electrical contact with a stationary pickup to permit simultaneous rotation of the reel and the electrical communication between the control cable and the video game unit.

9 Claims, 4 Drawing Sheets

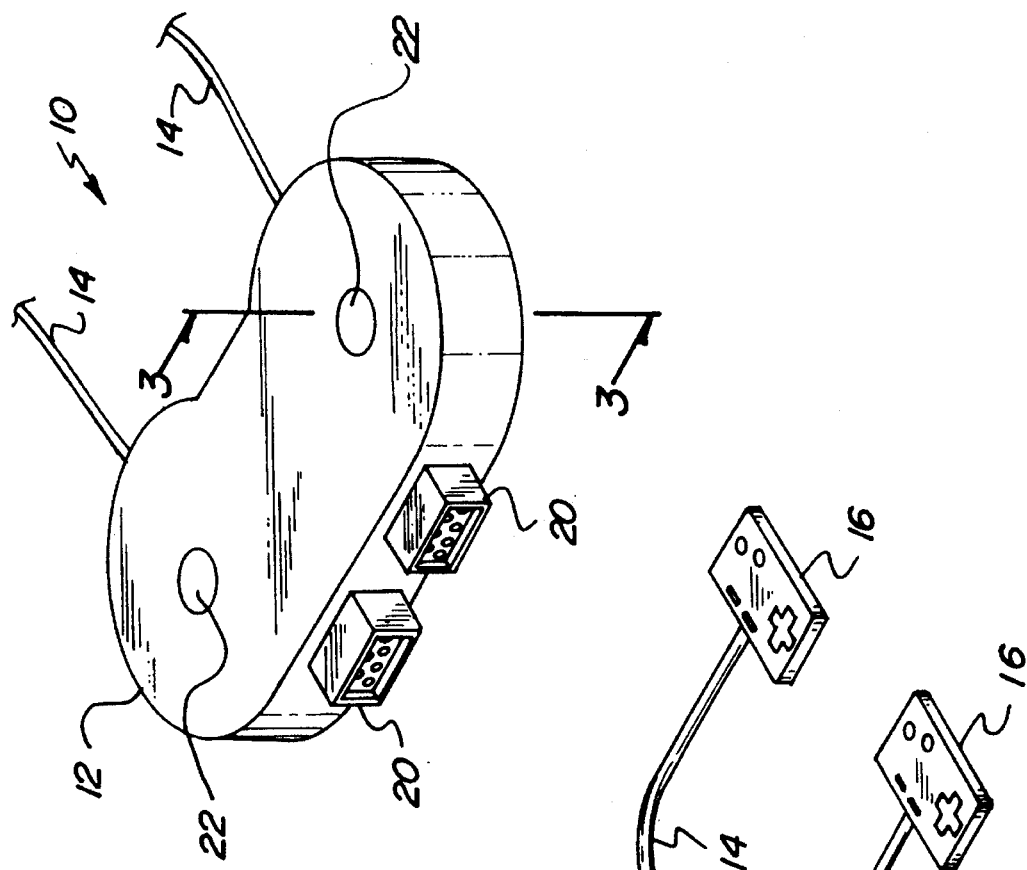
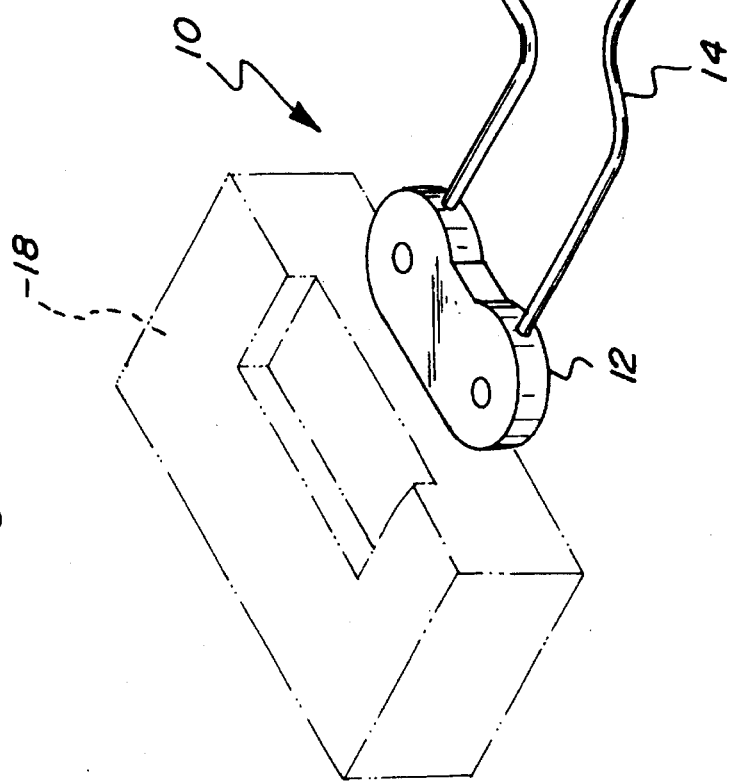

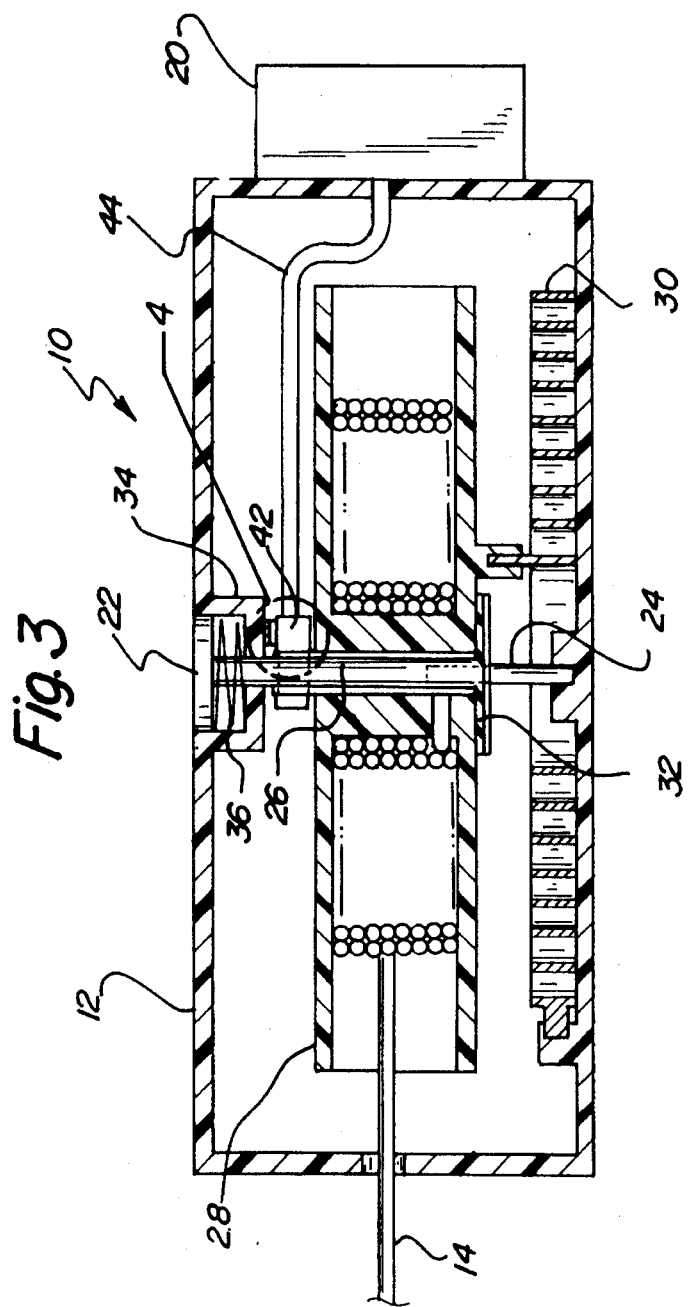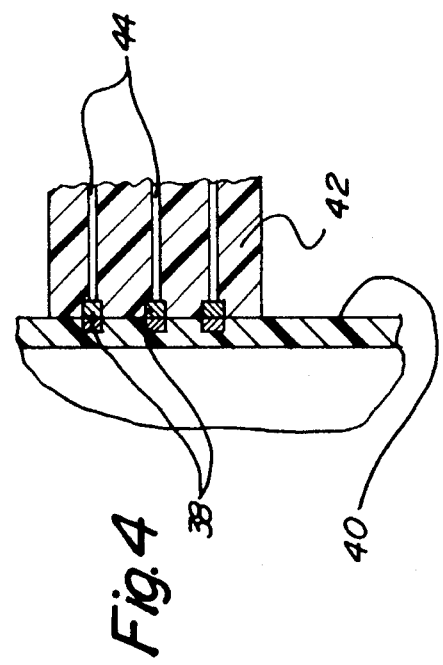

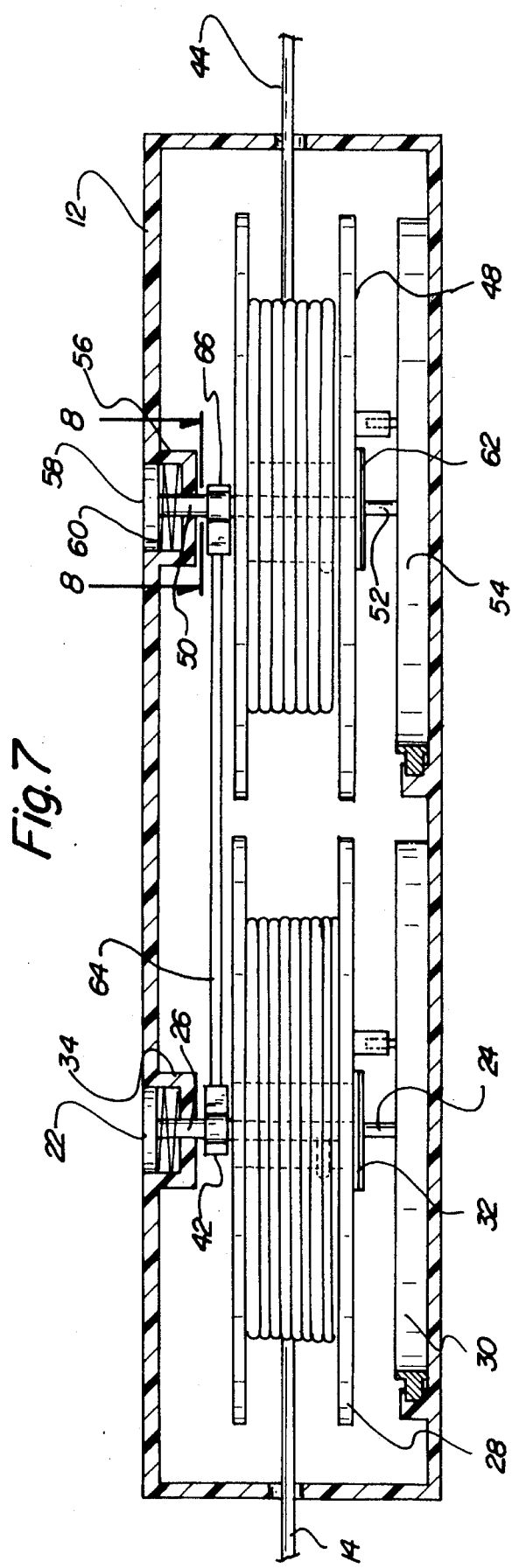
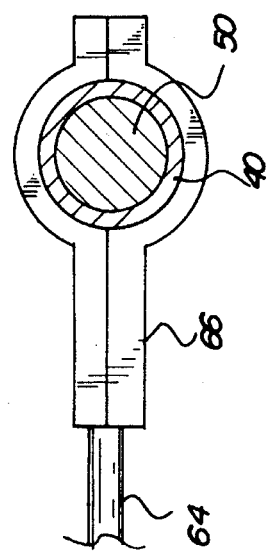
Fig. 7
Fig. 8

RETRACTABLE VIDEO GAME CABLE STORAGE DEVICE

BACKGROUND OF THE INVENTION

1. Field of the Invention

The present invention relates to cord storage structures and more particularly pertains to a retractable video game cable storage device for storing the cable extending between a control pad and the video game unit.

2. Description of the Prior Art

The use of cord storage structures is known in the prior art. More specifically, cord storage structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art cord storage structures include U.S. Pat. Nos. 4,232,837; 4,114,736; 3,705,962; 4,901,938; and 5,114,091.

While these devices fulfill their respective, particular objectives and requirements, the aforementioned patents do not disclose a retractable video game cable storage device for storing the cable extending between a control pad and a video game unit which includes a main body having a control cable reel rotatably supported by a cable reel axle, with the cable reel being rotatably biased by a spiral spring so as to wind the control cable of the video game into the main body and about the reel. Furthermore, none of the known prior art cord storage structures teach or suggest a retractable video game cable storage device of the aforementioned structure in which the control cable communicates with a plurality of movable contacts positioned in electrical contact a stationary pickup to permit simultaneous rotation of the reel and the electrical communication between the control cable and the video game unit.

In these respects, the retractable video game cable storage device according to the present invention substantially departs from the conventional concepts and designs of the prior art, and in so doing provides an apparatus primarily developed for the purpose of storing the cable extending between a control pad and a video game unit.

SUMMARY OF THE INVENTION

In view of the foregoing disadvantages inherent in the known types of cord storage structures now present in the prior art, the present invention provides a new retractable video game cable storage device construction wherein the same can be utilized for storing the cable extending between a control pad and the video game unit. As such, the general purpose of the present invention, which will be described subsequently in greater detail, is to provide a new retractable video game cable storage device apparatus and method which has many of the advantages of the cord storage structures mentioned heretofore and many novel features that result in a retractable video game cable storage device which is not anticipated, rendered obvious, suggested, or even implied by any of the prior art cord storage structures, either alone or in any combination thereof.

To attain this, the present invention generally comprises a video game cable storage device for storing the cable extending between a control pad and the video game unit. The inventive device includes a main body having a control cable reel rotatably supported by a cable reel axle. The cable reel is rotatably biased by a spiral spring so as to wind the control cable of the video into the main body and about the reel. The control cable communicates with a plurality of movable contacts positioned in electrical contact with a stationary pickup to permit simultaneous rotation of the reel and the electrical communication between the control cable and the video game unit.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable video game cable storage device apparatus and method which has many of the advantages of the cord storage structures mentioned heretofore and many novel features that result in a retractable video game cable storage device which is not anticipated, rendered obvious, suggested, or even implied by any of the prior art cord storage structures, either alone or in any combination thereof.

It is another object of the present invention to provide a new retractable video game cable storage device which may be easily and efficiently manufactured and marketed.

It is a further object of the present invention to provide a new retractable video game cable storage device which is of a durable and reliable construction.

An even further object of the present invention is to provide a new retractable video game cable storage device which is susceptible of a low cost of manufacture with regard to both materials and labor, and which accordingly is then susceptible of low prices of sale to the consuming public, thereby making such retractable video game cable storage devices economically available to the buying public.

Still yet another object of the present invention is to provide a new retractable video game cable storage device which provides in the apparatuses and methods of the prior art some of the advantages thereof, while simultaneously overcoming some of the disadvantages normally associated therewith.

Still another object of the present invention is to provide a new retractable video game cable storage device for storing the cable extending between a control pad and a video game unit.

Yet another object of the present invention is to provide a new retractable video game cable storage device which includes a main body having a control cable reel rotatably supported by a cable reel axle, with the cable reel being rotatably biased by a spiral spring so as to wind the control cable of the video game into the main body and about the reel.

Even still another object of the present invention is to provide a new retractable video game cable storage device of the aforementioned structure in which the control cable communicates with a plurality of movable contacts positioned in electrical contact with a stationary pickup to permit simultaneous rotation of the reel and the electrical communication between the control cable and the video game unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a an isometric illustration of a retractable video game cable storage device according the present invention.

FIG. 2 is a an enlarged isometric illustration of the main body of the device.

FIG. 3 is a cross sectional view taken along line 3—3 of FIG. 2.

FIG. 4 is a an enlarged cross sectional view of the area set forth in FIG. 3.

FIG. 7 is a cross section illustration taken from 7—7 of FIG. 5.

FIG. 8 is a further cross section view taken along line 8—8 of FIG. 7.

DESCRIPTION OF THE PREFERRED EMBODIMENT

Figure 6:
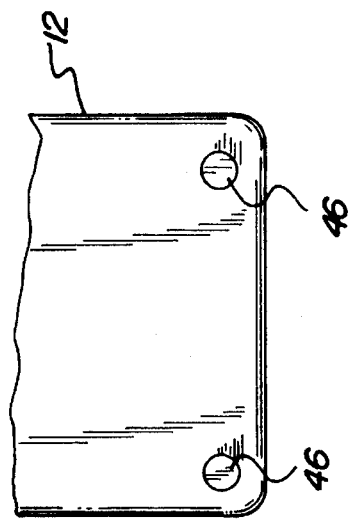
FIG. 6 is a is a bottom plan view taken from line 6—6 of FIG. 5.

With reference now to the drawings, and in particular to FIGS. 1–8 thereof, a new retractable video game cable storage device embodying the principles and concepts of the present invention and generally designated by the reference numeral 10 will be described.

More specifically, it will be noted that the retractable video game cable storage device 10 comprises a main body 12 having a substantially hollow interior within which at least one, and preferably a pair of control cables 14 can be removably stored. The control cables 14 each individually communicate with a control pad 16 operable to effect operation of a video game unit 18 through an individual one of a pair of interface plugs 20 cooperable with the video game unit 18. The control cables 14 can be selectively extended from the main body 12 by simply pulling on each cable to a length as desired, whereby actuation of either of a pair retract buttons 22 will effect rewinding of the respective control cable 14 back into the main body 12.

Turning now to FIGS. 3 and 4, can be shown that the present invention 10 comprises a cable reel axle 24 which is fixedly mounted within the main body 12 and projects into a movably mounted cable reel axle receiver 26. A control cable reel 28 is rotatably mounted about the cable reel axle receiver 26 and operable to rotatably receive and store the control cable 14 thereabout. The control cable reel 28 is rotatably biased in a predetermined direction by a spiral spring 30 coupled between the main body 12 and a portion of the control cable reel 28. Preferably, the spiral spring 30 rotates in a predetermined direction such that the control cable 14 is wound onto the control cable reel 28 to retract the control cable 14 into the main body 12, whereby the control cable can be selectively extended therefrom to a desired distance. To selectively preclude rotation of the control cable reel 28 relative to the main body 12, a brake pad 32 is removably positioned in contact with the control cable reel to effect automatic frictional locking of the reel when a desired amount of the cable 14 has been dispensed therefrom. To this end, the main body 12 is provided with a button cavity 34 within which the cable reel retract button 22 is positioned. The retract button 22 is mounted to a upper proximal end of the cable reel axle receiver 26, with a spring 36 being positioned within the button cavity 34 so as to bias the retract button 22 in an upward direction. The cable reel axle receiver 26 extends through the cable reel 28 and terminates at a lower distal end thereof in a circular plate upon which the brake pad 32 is mounted. By this structure, the cable reel axle receiver 26 is movably biased in an upward direction by the spring 36 so as to cause the brake pad 32 to engage a lower surface of the control cable reel 28, thereby selectively precluding rotation of the control cable reel relative to the main body 12 and retaining the desired length of control cable 14 exterior of the main body.

As shown in detail in the cross section illustration of FIG. 4, the control cable 14 is positioned in electrical communication with a plurality of center contacts 38 which are mounted concentrically about a center portion 40 of the control cable reel 28. A cable reel stationary pickup 42 is positioned in electrical communication with the center contacts 38 along the center portion 40 of the control cable reel 28 and permits communication between the center contacts and an interface wire 44 extending between the stationary pickup 42 and the interface plug 20 mounted exteriorly of the main body 12. By this structure, the control cable reel 28 is free to rotate, thereby permitting retracting or dispensing of the control cable 14 as desired, while simultaneously providing for electrical communication between the control cable and the interface plug 20 during use of the device 10.

Figure 5:
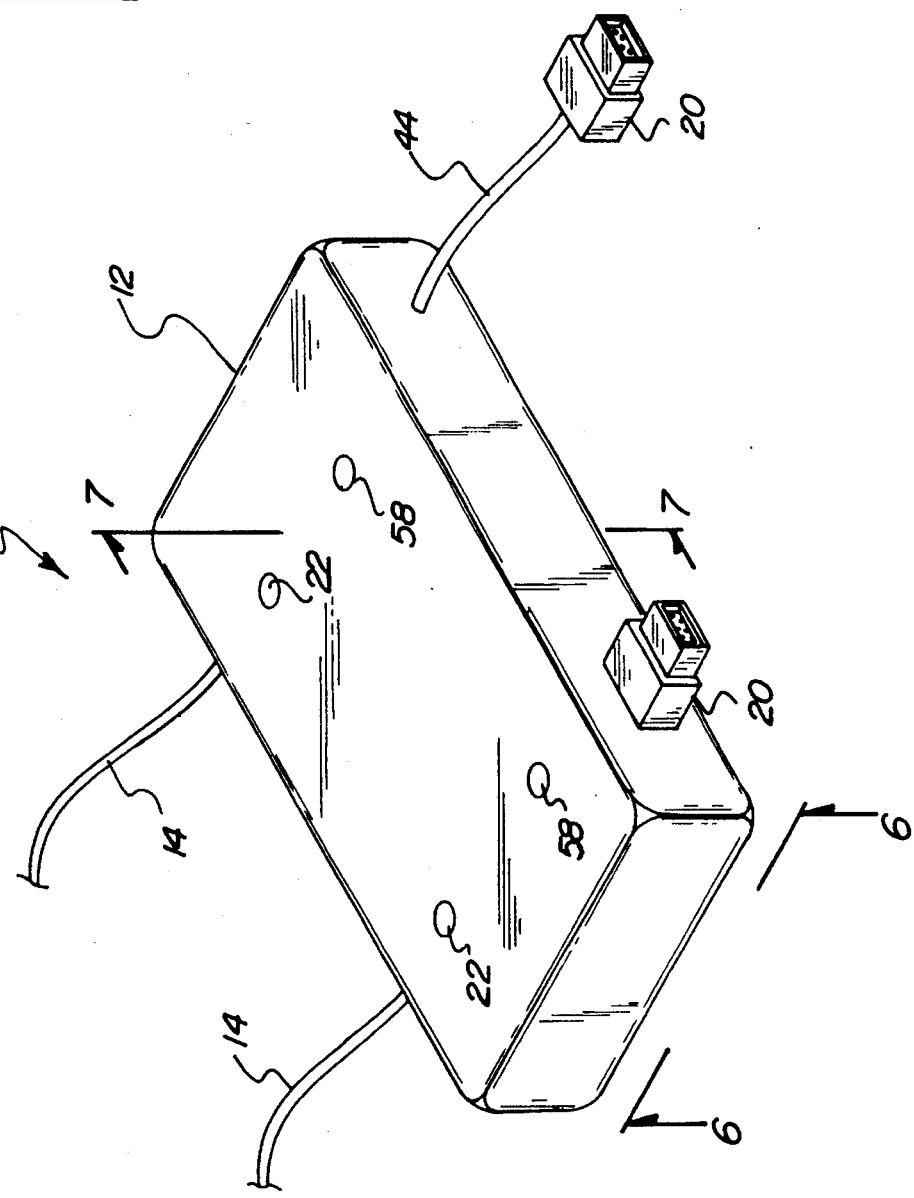
FIG. 5 is a isometric illustration of the present invention including a pair of wire reels.

Turning now to FIGS. 5 and 6, it can be shown that the interface wire 44 may additionally be removably stored within the main body 12 in a manner similar to that utilized to store the control cable 14, whereby the interface plugs 20 can also be selectively extended from the main body 12 and engaged to the video game unit 18. In this particular arrangement, and as illustrated in FIG. 6, it is desirable to include a plurality of feet 46 along a bottom portion of the main body 12 to preclude movement of the main body during extension and/or retraction of either the control cables 14 or the interface wires 44. To this end, the feet 46 may comprise frictional rubber feet or, alternatively, may comprise adhesive feet which can be adhesively attached to various items such as a television, the video game unit 18, or other articles of furniture.

Turning now to FIGS. 7 and 8, it can be shown that the present invention 10 including the means to retract the interface wire 44 within the main body 12 comprises an interface wire reel 48 rotatably mounted about a wire reel axle receiver 50 supported by a wire reel axle 52. The interface wire reel 48 is similarly biased in a predetermined direction by a spiral spring 54 engaged to both the main body 12 and the interface wire reel 48. In this arrangement, the main body 12 includes an additional button cavity 56 within which a wire reel retract button 58 is movably mounted at an upper proximal end of the wire reel axle receiver 50 with a spring 60 being interposed between the wire reel retract button and a lower portion of the button cavity 56 to bias an additional brake pad 62 into contact with the interface wire reel 48 in a substantially similar manner and for the same purpose as the brake pad 32 described above. By this structure, the interface wire 44 can be selectively extended from the main body 12, wherein a depression of the wire reel retract button 58 will cause the spiral spring 54 to effect rewinding or retraction of the interface wire back into the main body 12 and about the interface wire reel 48.

To provide communication between the control cable 14 and the interface wire 44, a center conductor 64 extends between the cable reel stationary pickup 42 and a wire reel stationary pickup 66. Because the wire reel stationary pickup 66 is substantially identical in construction to the cable stationary pickup 42, including the center contacts 38 disposed about the center portion 40 of the reel, the wire reel stationary pickup 66 will not be described in detail.

In use, the retractable video game cable storage device 10 provides a neat and compact means for storing the various cables associated with video game unit 18. As such, the device 10 reduces the amount of time needed to store the control cables 14 while simultaneously increasing safety around the video game unit 18 by eliminating or reducing the possibility of interference of the control cables 14 with moving objects of individuals.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A retractable video game cable storage device comprising:

a main body having a substantially hollow interior;

an interface plug;

a control cable reel rotatably mounted within said hollow interior of said main body;

a control cable disposed about said control cable reel, said control cable being in electrical communication with said interface plug;

spring means for biasing said cable reel in a predetermined direction;

a cable reel axle mounted within said main body;

a cable reel axle receiver movably mounted within said main body about said cable reel axle, said control cable reel being rotatably mounted about said cable reel axle receiver;

a control cable retract button mounted to an upper proximal end of said cable reel axle receiver;

a control cable brake plate mounted to a lower distal end of said cable reel axle receiver;

a control cable brake pad mounted to said control cable brake plate;

a spring engaged to said cable reel axle receiver for biasing said cable reel axle receiver in a direction so as to cause said control cable brake pad to engage a surface of said control cable reel, thereby selectively precluding rotation of said control cable reel relative to said main body.

2. The retractable video game cable storage device of claim 1, wherein said spring means comprises a spiral spring coupled between said main body and a portion of said control cable reel.

3. The retractable video game cable storage device of claim 2, and further comprising a plurality of center contacts mounted concentrically about a center portion of said control cable reel, said center contacts being in electrical communication with said control cable; and a cable reel stationary pickup positioned in electrical communication with said center contacts, said cable reel stationary pickup being in electrical communication with said interface plug.

4. The retractable video game cable storage device of claim 3, and further comprising an interface wire for providing electrical communication between said control cable and said interface plug, and means to retract said interface wire within said main body.

5. The retractable video game cable storage device of claim 4, wherein said means to retract said interface wire within said main body comprises an interface wire reel rotatably mounted within said hollow interior of said main body; an interface wire reel axle mounted within said main body; an interface wire reel axle receiver movably mounted within said main body about said interface wire reel axle, said interface wire rotatably mounted about said interface wire reel axle receiver; an interface wire retract button mounted to an upper proximal end of said interface wire reel axle receiver; an interface wire reel brake plate mounted to a lower distal end of said interface wire reel axle receiver; an interface wire reel brake pad mounted to said interface wire reel brake plate; and an interface wire reel spring engaged to said interface wire reel axle receiver for biasing said interface wire reel axle receiver in a direction so as to cause said interface wire reel brake pad to engage a surface of said interface wire reel, thereby selectively precluding rotation of said interface wire reel relative to said main body.

6. The retractable video game cable storage device of claim 5, and further comprising a plurality of interface wire center contacts mounted concentrically about a center portion of said interface wire reel, said interface wire center contacts being in electrical communication with said interface wire; and an interface wire reel stationary pickup positioned in electrical communication with said interface wire center contacts, said interface wire reel stationary pickup being in electrical communication with said cable reel stationary pickup.

7. A retractable video game cable storage device comprising:

a main body having a substantially hollow interior;

an interface plug;

a control cable reel rotatably mounted within said hollow interior of said main body; a cable reel axle mounted within said main body; a cable reel axle receiver movably mounted within said main body about said cable reel axle, said control cable reel being rotatably mounted about said cable reel axle receiver; a control cable retract button mounted to an upper proximal end of said cable reel axle receiver; a control cable brake plate mounted to a lower distal end of said cable reel axle receiver; a control cable brake pad mounted to said control cable brake plate; a spring engaged to said cable axle receiver for biasing said cable reel axle receiver in a direction so as to cause said brake pad to engage a surface of said control cable reel, thereby selectively precluding rotation of said control cable reel relative to said main body;

a control cable disposed about said control cable reel, said control cable being in electrical communication with said interface plug;

spring means for biasing said cable reel in a predetermined direction, said spring means comprising a spiral spring coupled between said main body and a portion of said control cable reel;

a plurality of center contacts mounted concentrically about a center portion of said control cable reel, said center contacts being in electrical communication with said control cable; a cable reel stationary pickup positioned in electrical communication with said center contacts, said cable reel stationary pickup being in electrical communication with said interface plug;

an interface wire for providing electrical communication between said control cable and said interface plug; an interface wire reel rotatably mounted within said hollow interior of said main body; an interface wire reel axle mounted within said main body; an interface wire reel axle receiver movably mounted within said main body about said interface wire axle, said interface wire reel axle being rotatably mounted about said interface wire reel axle receiver; an interface wire retract button mounted to an upper proximal end of said interface wire reel axle receiver; an interface wire reel brake plate mounted to a lower distal end of said interface wire reel axle receiver; an interface wire reel brake pad mounted to said interface wire reel brake plate; an interface wire reel spring engaged to said interface wire reel axle receiver for biasing said interface wire reel axle receiver in a direction so as to cause said interface wire reel brake pad to engage a surface of said interface wire reel, thereby selectively precluding rotation of said interface wire reel relative to said main body;

a plurality of interface wire center contacts mounted concentrically about a center portion of said interface wire reel, said interface wire center contacts being in electrical communication with said interface wire; and an interface wire reel stationary pickup positioned in electrical communication with said interface wire center contacts, said interface wire reel stationary pickup being in electrical communication with said cable reel stationary pickup; and, a plurality of feet mounted to a bottom portion of said main body for precluding movement of said main body relative to a supporting surface.

8. The retractable video game cable storage device of claim 7, wherein said feet comprise frictional rubber feet.

9. The retractable video game cable storage device of claim 7, wherein said feet comprise adhesive feet which can be adhesively attached to said supporting surface.

* * * * *